No. 893,441. PATENTED JULY 14, 1908.
M. J. CARUTHERS.
PLANT PROTECTOR.
APPLICATION FILED NOV. 8, 1907.
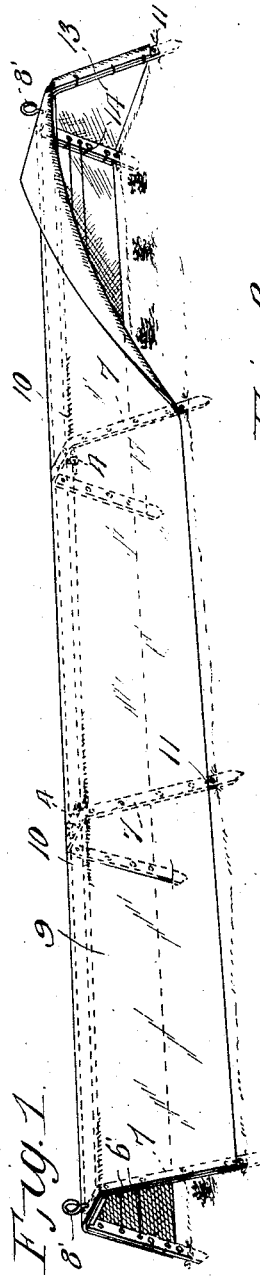
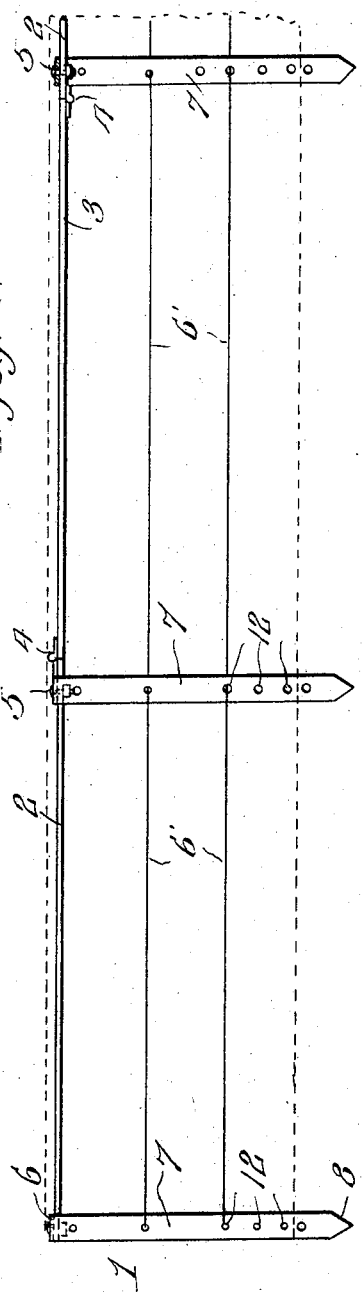
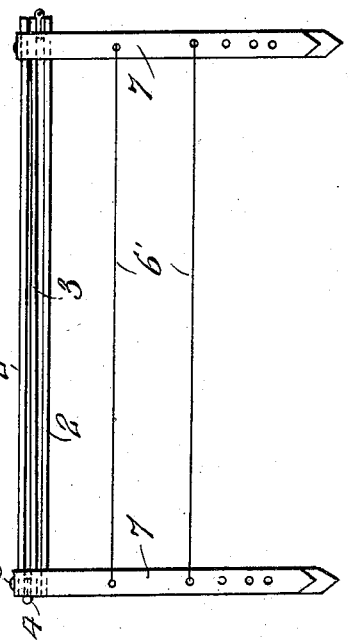
Witnesses
Frank Hough.
P. M. Smith.
Inventor
Martha J. Caruthers,
By Victor J. Evans.
Attorney

UNITED STATES PATENT OFFICE.

MARTHA J. CARUTHERS, OF SHERMAN, TEXAS.

PLANT-PROTECTOR.

No. 893,441.

Specification of Letters Patent.

Patented July 14, 1908.

Application filed November 8, 1907. Serial No. 401,275.

*To all whom it may concern:*

Be it known that I, MARTHA J. CARUTHERS, a feme sole and a citizen of the United States, residing at Sherman, in the county of Grayson and State of Texas, have invented new and useful Improvements in Plant-Protectors, of which the following is a specification.

This invention relates to plant protectors, the object of the invention being to provide an elongated tent or canopy for protecting young and tender plants from the weather, the protector as a whole being composed of a plurality of jointed and folding sections comprising frames and a cover therefor so associated that the device as a whole may be folded compactly for storage or transportation.

With the above general object in view and other detailed objects, the nature of which will more fully appear as the description proceeds, the invention consists in the novel construction, combination and arrangement of parts hereinafter fully described, illustrated and claimed.

In the accompanying drawings,—Figure 1 is a perspective view of a plant protector embodying the present invention. Fig. 2 is a side elevation of the frame-work, the cover being indicated by dotted lines. Fig. 3 is also a side elevation showing the sections of the protector folded together, the cover being omitted to avoid confusion.

The plant protector contemplated in this invention comprises essentially a plurality of frames or arches, and a sectional and folding ridge piece made up of sections 2 and 3 having a jointed connection with each other as by hinges indicated at 4, the ridge piece as a whole being riveted or otherwise permanently secured as at 5 or at the end or edges to the body or crown portions 6 of the several frames or arches 1.

Under the preferred embodiment of this invention, each frame or arch comprises the upper horizontal body or crown portion 6 and the downwardly diverging legs or upright portions, the extremities of which are preferably pointed as indicated at 8 to facilitate their insertion in the ground. Now it will be noted that while the sections 2 of the ridge piece are permanently and rigidly fastened to adjacent frames or arches 1, the alternate sections 3 are not fastened directly to the arches or frames but are hinged at 4 to the extremities of the sections 2 which extremities project sufficiently to receive the hinges 4. It will be further noted that the sections 3 are somewhat shorter than the sections 2 and that the hinges 4 at opposite ends of the sections 3 are reversely disposed so as to break or fold in opposite directions, which permits all of the sections to be folded in the position shown in Fig. 3, thereby nesting all of the frames or arches 1 together in pairs for convenience in storage and transportation.

The downwardly diverging legs or upright portions are perforate with holes or provided with other suitable devices at convenient distances from the said crown portions through which or to which cords or wires 6' of any suitable material run or are secured longitudinally along each side through the entire sections, or they may be tied or secured in any suitable manner to the said legs of one or more sections separately. Said longitudinal cords or wires serve the purpose of holding the sides of said cover off of the plants covered. Said folding sections to be in combinations or series of different convenient numbers and lengths. At each end of each combination of said sections is provided an iron ring 8' or other suitable device secured to the top of the crown portion or ridge piece or pieces in any convenient manner for the purpose of lifting said combination.

A cover 9 of any suitable flexible material such as textile fabric is extended continuously over all of the frames or arches and the ridge piece or pieces and is secured to the ridge piece or pieces as indicated at 10, while the side portions of the cover are preferably provided along their edges with cords or ties 11 by which the cover is held down against the legs of the frames or arches, the latter being provided with holes 12 through which the ties or cords 11 may be threaded and made fast. The cover may be fastened to said legs in any other suitable manner. This permits either side of the cover to be unfastened and thrown back as shown at the right hand of Fig. 1 when occasion requires. End aprons 13 may be detachably connected to the end frames 1 with the aid of suitable cords or ties 14 as shown in Fig. 1. The cover 9 will not interfere in the slightest with folding the sections of the protector together after the manner of the folds of a bellows as indicated in Fig. 3.

An important advantage of the invention resides in the fact that the ridge piece forms

Having thus fully described the invention, what is claimed as new is:—

1. A plant protector comprising a series of arches, a ridge piece connecting the arches and composed of a plurality of sections jointed in such manner as to fold one upon the other, and a cover of flexible material extending over the arches and ridge piece and secured to the ridge piece and adapted to fold therewith.

2. A plant protector comprising a series of arches, a ridge piece connecting the arches and embodying a plurality of sections jointed together by reversely disposed hinges permitting the sections to be folded reversely upon each other, and a flexible cover extending over the arches and ridge piece and secured to the latter.

3. A plant protector comprising a series of arches, a ridge piece connecting the arches and composed of a plurality of sections jointed in such manner as to fold reversely one upon the other, and a cover of flexible material extending over the arches and ridge piece and adapted to fold therewith, each side of said cover being so fastened as to permit it to be loosened and thrown back over the other side and crown portion.

4. A plant protector comprising a series of arches, a ridge piece connecting the arches and composed of a plurality of sections jointed in such manner as to fold reversely one upon the other, a cover of flexible material extending over the arches and ridge piece and adapted to fold therewith, each side of said cover being so fastened as to permit it to be loosened and thrown back over the other side and crown portion, and cords extending lengthwise along opposite sides of the sections, to prevent the cover from sagging between the arches.

In testimony whereof I affix my signature in presence of two witnesses.

MARTHA J. CARUTHERS.

Witnesses:
   B. F. STANFORD,
   R. L. CARUTHERS.